March 11, 1969 P. J. HUBBARD 3,432,101
CYCLONIC REACTOR
Original Filed Feb. 3, 1966 Sheet 1 of 3
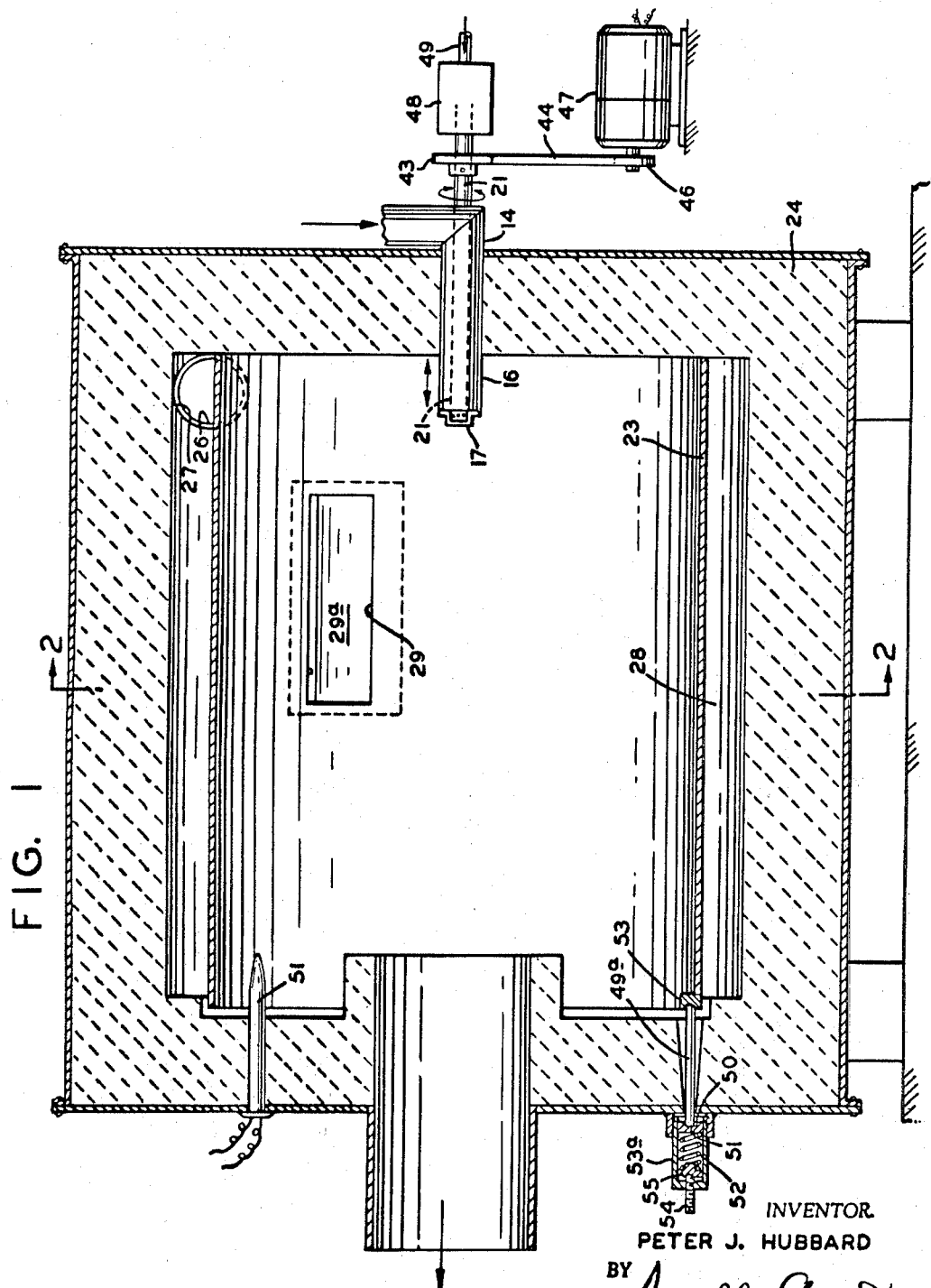
INVENTOR.
PETER J. HUBBARD
BY Arnold Grant
ATTORNEY.

March 11, 1969     P. J. HUBBARD     3,432,101
CYCLONIC REACTOR
Original Filed Feb. 3, 1966
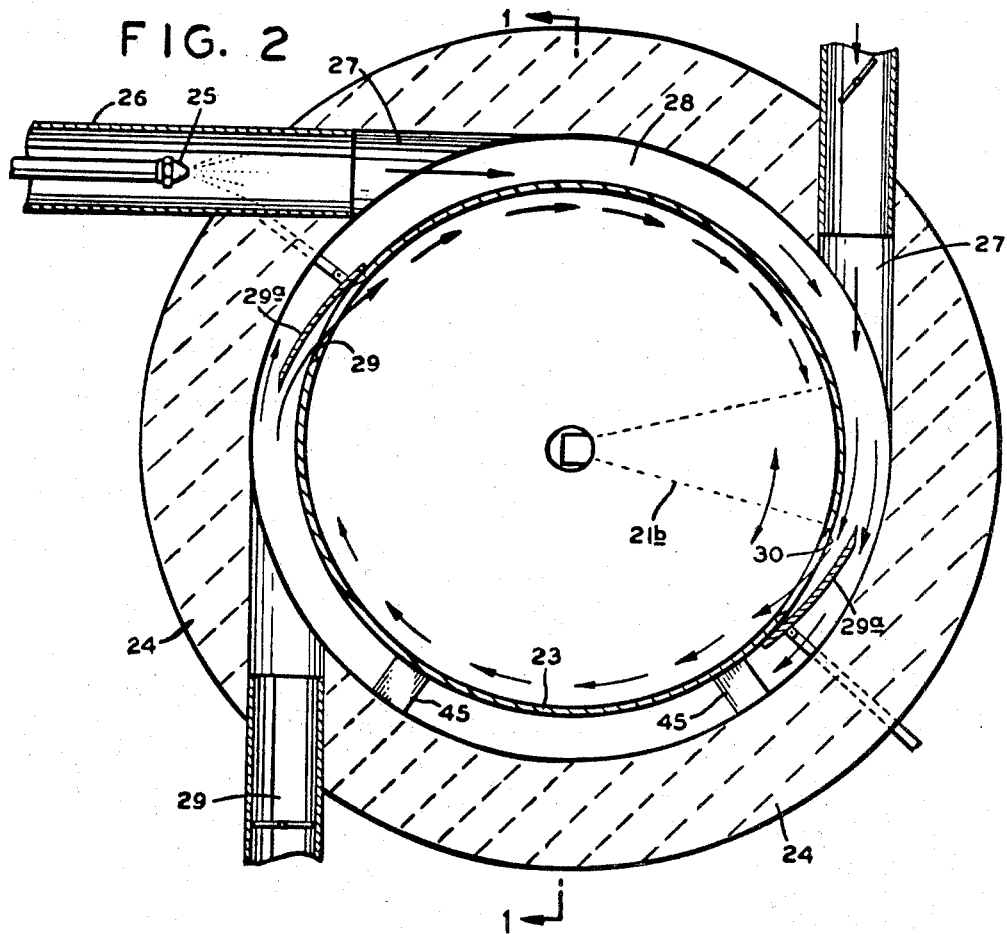
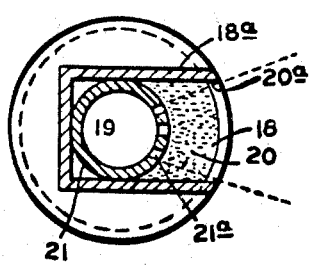
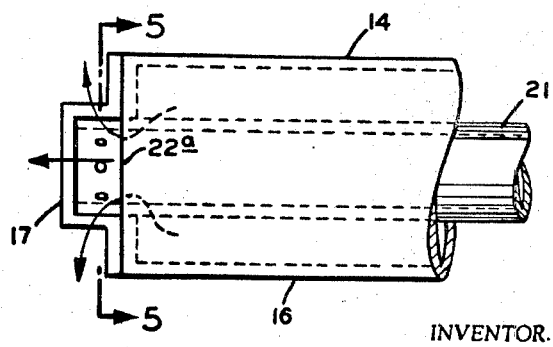
INVENTOR.
PETER J. HUBBARD
BY Arnold Grant
ATTORNEY.

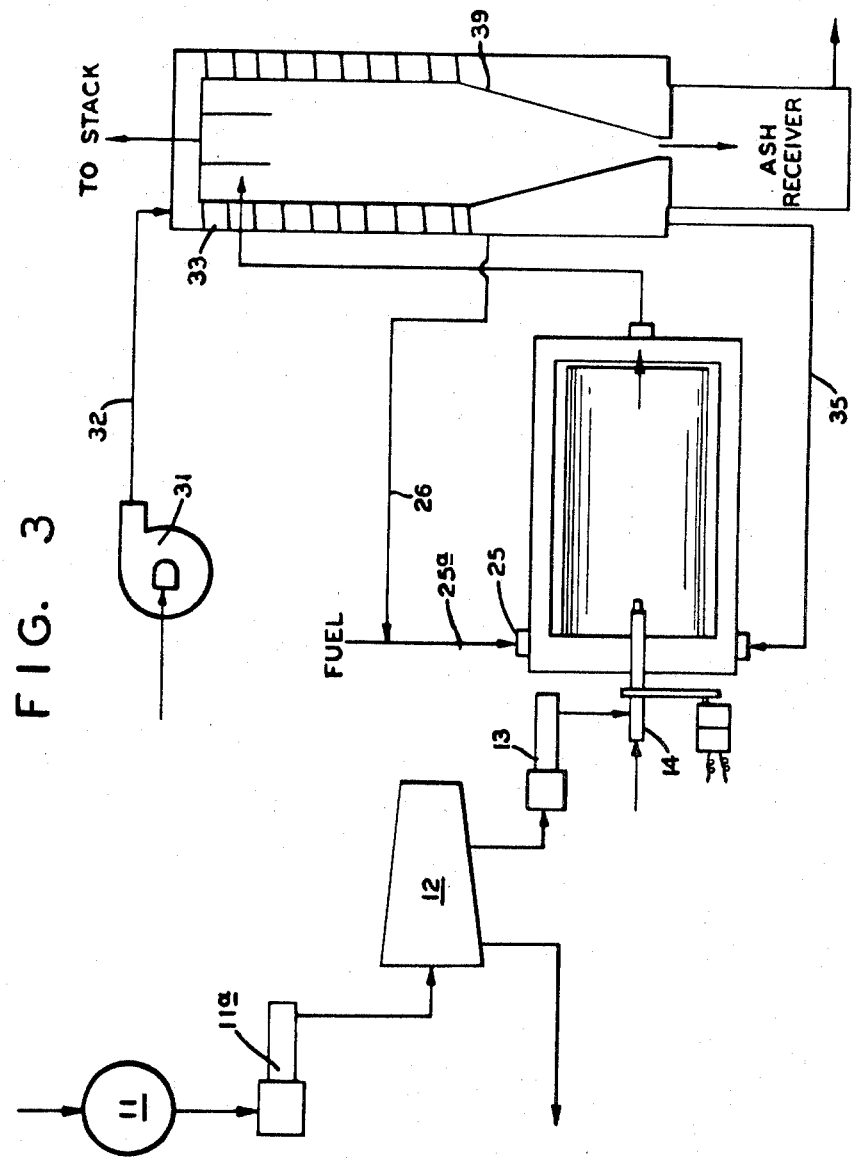

United States Patent Office 3,432,101
Patented Mar. 11, 1969

3,432,101
CYCLONIC REACTOR
Peter J. Hubbard, Norwalk, Conn., assignor to Dorr-Oliver Incorporated, Stamford, Conn., a corporation of Delaware
Original application Feb. 3, 1966, Ser. No. 524,715. Divided and this application Apr. 11, 1967, Ser. No. 649,381
U.S. Cl. 239—214.17
Int. Cl. B05b 3/02; F23d 11/04
2 Claims

ABSTRACT OF THE DISCLOSURE

This invention relates to an atomizing device for spraying coarse material such as, for example, spraying comminuted sewage sludge into a combustion chamber for rapid burning therein.

---

This is a division of application Ser. No. 524,715, filed Feb. 3, 1966, now abandoned.

One of the objectives of the invention is the subdivision of the sludge into finely divided particles followed by extremely rapid drying and combustion of the subdivided sludge.

In attaining the above objects, applicant provides a cyclonic reactor which utilizes high velocity swirling hot combustion gases in combination with an improved method of atomized spraying of the sludge against the interior surface of a thin heat conducting shell which shell is heated on both sides by the combustion gases.

Still another object is to provide a spray nozzle which has a large opening for sludge to avoid plugging up oversize pieces and which will evenly distribute finely divided atomized sludge about a high temperature interior surface of the inner combustion chamber.

Other objects and advantages will appear from the description of this invention and the appended drawings wherein:

FIGURE 1 is a side elevation of the combustion chamber taken in section along the line 1—1 of FIG. 2.

FIGURE 2 is a cross-sectional view of the combustion chamber shown in FIG. 1 taken on the line 2—2 of FIGURE 1.

FIGURE 3 is a flow diagram showing diagrammatically the feeding and dewatering of the sludge to the combustion unit, and the supplying of combustion and secondary air, and fuel. This figure also shows preheating of the fuel combustion and secondary air and the disposition of ash through a cyclone air cleaner.

FIGURE 4 is an enlarged vertical side view of the atomizing sludge spraying nozzle.

FIGURE 5 is a sectional view on the line 5—5 of the nozzle end shown in FIGURE 4 showing in shaded area the large sludge opening.

Referring now to FIGURE 3, wet sewage sludge from a conventional sedimentation device or thickener (not shown) passes through a comminuter or grinder 11 and pump 11a, and to a centrifuge 12 which delivers mechanically dewatered sludge cake having a solids content preferably between 20–50% solids to a Moyno pump 13 which feeds the sludge under pressure into nozzle 14 through outer sludge tube 16 against end plate 17. Tube 16 is slidable in wall 24 but is held against rotation. A compressed air tube 21 is mounted for rotation within and concentric with the outer sludge tube. Plate 17 shown in FIGS. 4 and 5 is secured to the rotating compressed air tube to rotate therewith, and closes the end of the sludge tube 16 on the line 22a of FIG. 4 except for the shaded area shown at 20 in FIG. 5. The plate 17 also closes the end of the compressed air tube but is open at 18 in the same radial direction as the air blast openings 21a, as also shown by the shaded sludge opening 20a. The result is to provide a rotating cone or fan-shaped spray 21b (FIG. 2) which progressively sprays an entire circumferential zone of heated stainless steel shell 23. Guide ribs 18a lead to the lateral opening in the closure plate and control line width of the spray.

A metal shell 23 of heat resistant and heat conducting material, such as stainless steel, is concentrically spaced within the refractory wall 24 of fire brick or other refractory insulating material of the outer chamber. A conventional furnace gun 25 supplied with fuel from pipe 25 and with combustion air from pipe 26, and preheated as will subsequently be described, supplies the hot combustion gas at a temperature preferably of 2400° F. through a tangential opening 27a into the space 28 between the stainless steel shell 23 and the inner wall of refractory combustion chamber 24. This causes a cyclonic circular or swirling motion in this space and heats the stainless steel shell to substantially the same temperature as the hot combustion gases. At points spaced approximately from the entrance of the burning combustion gases are tangential secondary air inlets 27 for supplying the additional combustion air needed to burn the sludge. This secondary air is preheated as will be hereinafter described and is fed in tangentially to mix with the hot combustion gases. The secondary air inlets 27 are spaced from each other and the hot combustion gas opening 27a both circumferentially and longitudinally of the combustion chamber 24.

The combined hot gases continue in the circular space between shell and outer combustion chamber wall to openings 29 and 30 in the shell which permit the hot combustion gases to enter within the combustion chamber inside the shell, still in a tangential direction producing a continued whirling action of the gases within the shell. These openings are spaced along the length of the chamber and about the periphery of the shell and are provided with adjustable dampers 29a arranged to scoop air tangentially into the shell so that the amount and velocity and also the temperature of the hot gases distributed along the length and periphery of the combustion chamber within the shell may be regulated.

Combustion and secondary air is provided by an air blower 31 delivering air through conduit 32 to a preheater 33. From there pipe 34 delivers secondary air from the preheated to the secondary air inlet 28 which is provided with a damper 28a to control excess air.

At the opposite end of the cylindrical combustion chamber from the spray nozzle is an exhaust outlet 37 leading through pipe 38 to the heat exchanger 33 and thence to a cyclone 39 for separating ash and entrained material from the exhaust gases from which the overflow goes to pipe 39 to the stack. The underflow from the cyclone goes to an ash receptacle 41. About the exhaust outlet is an inwardly projecting refractory annular projection 42 which together with the circular wall of the stainless steel shell form a raceway in which oversize particles of ash continue to circulate as long as the centrifugal force due to their size is sufficient to overcome the entraining effect of the exhaust gases. These larger particles are ground up in this raceway until fine enough to be entrained by the exhaust. As a result, ash removal is automatic by way of the exhaust gases.

A suitable drive mechanism consisting of a pulley 43 secured to the compressed air tube is driven by a belt 44 from pulley 46 of a variable speed motor 47 by means of which the speed of rotation of the compressed air tube may be varied to attain optimum operation. A suitable stuffing box 48 maintains an airtight connection between the rotating tube and the stationary compressed air tube 49. For convenience in maintaining the spray nozzle, sludge tube is slidable in the refractory rear wall for removal after disconnecting the compressed air tube drive and the stuffing box. A pyrometer 51 extends through the refractory wall of the combustion chamber. This may be connected to suitable controls for automatically increasing or decreasing the supply of fuel to gun 25 or the rate of feed of sludge by pump 13 in a manner well known in the art in order to maintain temperatures within the combustion chamber substantially uniform.

Burner guns 24 and 25 are fed in through the inlet 15 into the circular space between the stainless steel shell and the refractory wall 24 and swirl around the stainless steel shell heating it to the temperature of the combustion gases. In operation, the finely atomized spray from the nozzle 11 impinges in finely divided narrow cone-shaped pattern against the hot inside wall of the shell and the spray is almost instantly dried and when viewed through a sight glass are seen to bounce off the shell, to be carried into the combustion gases within the shell for complete combustion. As the nozzle rotates the cone-shaped pattern of spray travels around the circumference of the inside of the heated stainless steel shell thus evenly distributing spray around a zone of the circumference and avoiding any spot cooling of the shell or any surplus of sludge spray which might build up. The deflected finely divided dried spray particles are whirled around in the combustion chamber until thoroughly burned to carbon dioxide and steam which passes out the exhaust.

Because of the high temperatures to which the shell is subjected, it is subject to substantial thermal expansion. In order to provide for this, the shell is loosely supported within the refractory combustion chamber which has little or no thermal expansion by means of four feet 45 (FIG. 1) spaced longitudinally and transversely on the underside of the shell. These feet are of such length that when the shell is cold they support the shell eccentrically within the chamber and when the shell is expanded the shell is substantially concentric and spaced the radial length of the feet from the chamber inner wall on all sides.

In order to allow longitudinal expansion and yet prevent leakage when the shell is expanded between the shell end and the end of the combustion chamber, there is provided at the exhaust end of the chamber an annular shoulder 46 having a cylindrical surface the diameter of which is greater than the diameter of the shell when cold by the amount of expansion of the shell from cold to combustion temperatures.

To avoid leakage when cold at the sprayed sludge and end of the combustion chamber in which the combustion gases first enter, resilient means are provided for pressing the shell against that end of the chamber. These consist of a lug 53 secured to the inside of the shell having in it a depression receiving a spring-pressed pin 49a urged against the depression by pin-engaging depression 50 of spring cap 51 pressed by a spring 52 held in place within a cylinder 53 which has threaded in its outer end an adjustable set screw 54 engaging a spring cap 55 for tensioning the spring.

I claim:
1. An atomizing device for spraying flowable coarse material within a chamber, which comprises in combination, an elongated outer stationary conduit having an open inner end projecting within the chamber, means feeding said material into said conduit, a smaller compressed air tube extending generally axially through said conduit, means for rotating said compressed air tube, an end closure for the inner end of the conduit secured to said tube for rotation therewith while closing said inner end, said closure having a lateral opening therein of sufficient size to pass the coarse material and at least one smaller blast opening in said tube in alignment with said lateral opening for blasting an annularly travelling atomized stream of the material into the chamber.

2. The invention defined in claim 1 in which laterally extending walls cooperate with said opening for restricting said atomized material to a narrow stream of predetermined shape.

References Cited
UNITED STATES PATENTS
1,029,818  6/1912  Noble _____ 239—214.11

EVERETT W. KIRBY, *Primary Examiner.*